United States Patent [19]

Pertzsch et al.

[11] 3,923,271

[45] Dec. 2, 1975

[54] TAPE WINDING CONTROL FOR MAGNETIC TAPE CASSETTES

[76] Inventors: Albert Pertzsch; Jose Toral; Gottfried Lutz; Werner Wilke; Anton Riedel, all of AGFA-Gevaert Aktiengesellschaft, Munich, Germany

[22] Filed: May 28, 1974

[21] Appl. No.: 473,390

[30] Foreign Application Priority Data

June 1, 1973 Germany ............................ 2327844

[52] U.S. Cl. .................................... 242/199; 352/72

[51] Int. Cl.² ... G03B 1/04; G11B 15/32; G11B 23/04

[58] Field of Search ........... 242/199, 200, 197, 198, 242/187, 76, 71.2; 352/72, 78 R; 360/96

[56] References Cited

UNITED STATES PATENTS

| | | | |
|---|---|---|---|
| 2,105,254 | 1/1938 | Martin | 242/71.2 X |
| 3,601,654 | 8/1971 | Long et al. | 242/199 |
| 3,841,582 | 10/1974 | Schaeffer | 242/199 |

*Primary Examiner*—Leonard D. Christian
*Attorney, Agent, or Firm*—Connolly and Hutz

[57] ABSTRACT

A tape-winding control is arranged between the roll of tape and tape-guide members. The control comprises a one-piece bow having a straight part which is mounted for displacement in the head compartment of the cassette. The distance between the ends of the bow must be at least equal to the sum of the axial interval between the two winding cores and twice the average radius of the roll of tape.

8 Claims, 4 Drawing Figures

TAPE WINDING CONTROL FOR MAGNETIC TAPE CASSETTES

This invention relates to a tape-winding control for magnetic-tape cassettes which acts between the roll of tape and a tape guide roller.

In known compact cassettes, the tape is wound on flangeless winding cores. As the cores are merely mounted on the centring rings of the cassette base or cover, disturbances can arise during high-speed rewinding, during starting and stopping of the tape. The resulting changes in tape travel give rise to the formation of "dished" and "stepped" rolls, to loop formation and to irregularities which can result in blockage of the roll of tape. With a view to eliminating these difficulties various embossed supporting films arranged on either side of the roll of tape and specially designed levers which guide the tape between the roll and the guide element, have been described.

An object of the invention is further to improve the control of tape winding, and in particular, to guide the tape as precisely and with as much definition as possible at that point where it runs on to the roll. Another important factor is that the tape-winding control should function optimally throughout the entire winding operation. In addition, the effort required to actuate the winding control should be negligible to prevent the winding torque from being excessively increased.

According to the invention, there is provided a tape winding control for a magnetic-tape cassette, which acts between a roll of tape and a tape-guide member, comprising a onepiece bow having a straight part which is mounted for displacement in a head compartment of the cassette, the distance between the ends of the bow being equal to at least the sum of the axial interval between the two winding cores and twice the average radius of the roll of tape.

When the cassette is in operation, a bow of this kind moves towards the side of the increasing roll of tape, whilst the tape itself is guided for as long as possible between the guide elements and the point at which it runs on to the outer layer of roll, in order to prevent the formation of a stepped roll. To ensure that the tape runs exactly on to the roll, the ends of the bow are preferable provided with lateral flanges. Since most of the tape-guide elements described are repeatedly present in the cassette, only a single bow is required to obtain the same advantage, which facilitates the production of compact cassettes.

A deflectable leaf spring can be arranged in the middle of the bow in order to indicate the length of tape which has been offwound. Since, on the offwinding side, the bow is displaced from its central position when the roll of tape is full, the indicator rests on the winding side and is deflected as the roll of tape increases in size. The movement of the indicator can be made visible through a circular opening in the cassette halves, with the result that there is no need for the conventional "window" between the two winding cores which only provides for rough assessment of the winding position. As the leaf spring rests on the winding side, the indicator also performs the function of a winding brake which also assists in preventing the formation of loops in the event of rapid changes in tape speed and direction. The combination of tape control and position indication is made possible in a simple, elegant manner by the shape of the bow according to the invention.

The invention is further described below with reference to the accompanying drawings, wherein.

Figure 1:
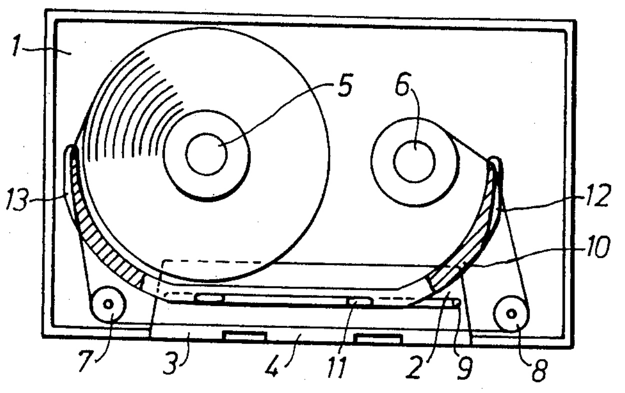
FIG. 1 is a plan view of the base of a compact cassette with a displaceable bow.

The magnetic tape cassette consists of two housing halves, its base 1 being thicker than the remaining area at its front end. Openings 3,4 are provided in the head compartment 2 which accommodates the sound heads and the head screen with contact spring and felt. In addition, two bores 5,6 are provided in the cassette base for inserting winding cores. The magnetic tape travels between the two rolls formed on the winding cores via the guide rollers 7 and 8 arranged at the front of the cassette. A guide groove or track 9, in which a bow 10 is mounted for displacement by way of the moveably connecting studs 11, extends longitudinally in the compartment of the cassette base. The ends of the bow are situated near the point at which the tape runs on to the roll, and guide the outermost layer of tape from the back thereof. By virtue of the arcuate form of the bow, the tape is guided over a relatively long distance as its diameter increases, facilitating the formation of a satisfactory roll. The lateral flanges 12, 13 assist in accurately guiding the tape near the point at which it runs on to the roll. During drive of the cassette, the bow is displaced as the roll of tape increases in size.

Figure 2:
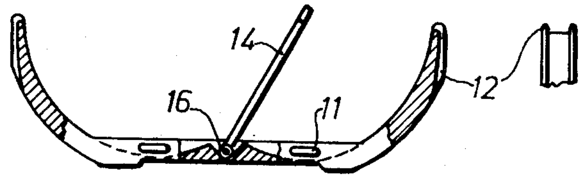
FIG. 2 is a cross-section through the bow with U-form rails and a leaf spring as an indicator.

The bow shown in longitudinal section in FIG. 2, is in the form of a U-shaped rail with elevated side walls, only that side facing towards the base of the cassette carrying studs 11 for guiding the bow in the groove. The internal width of the rail is greater than the width of the tape, with the result that the tape is unable to rub along the side walls of the rail. The underneath of the straight part of the bow can also be recessed in order to make it possible to accommodate rolls of the largest possible diameter.

Figure 3:
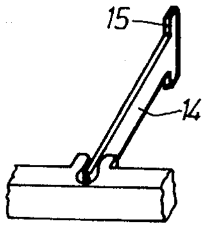
FIG. 3 shows a bow with a particular embodiment of the indicator.
Figure 4:
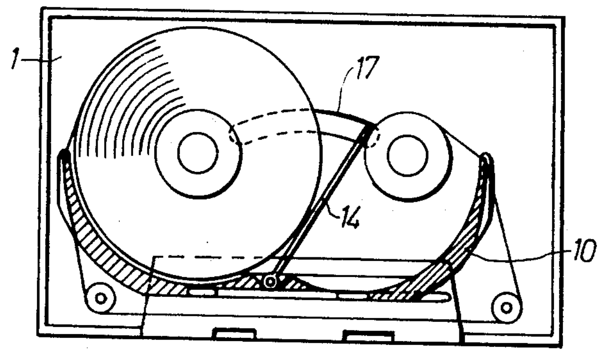
FIG. 4 is a plan view of the base of a cassette with an indicator.

This particular configuration of the bow makes it possible to use an indicator a leaf spring 14 which can be mounted for rotation, for example by means of a pin 16, in one side wall of the rail. The indicator can be introduced through an opening in the other side wall during manufacture of the cassette. The indicator can of course be connected to the bow by other means, for example, by inserting into a gap. This is illustrated in FIG. 3 which shows a T-shaped indicator. As shown in FIG. 4, the bow has moved to the offwinding side of the magnetic tape, so that the indicator is deflected in the opposite direction and rests on the winding core. As the roll of tape increases in size, the deflection of the indicator varies during playing. The movement of the indicator can be made visible through an arcuate cutout 17 with a scale marked around its edge. The indicator can be guided in the cut-out by the cross pieces 15 of its T-shape. Since the leaf spring always rests on the roll of tape on the winding side and applied a certain pressure thereto, it also performs the function of a winding brake which, as already mentioned, prevents loop formation and slipping of the tape in the event of rapid changes in tape speed and direction.

What we claim is:

1. A tape-winding control for a magnetic tape cassette, having a head compartment containing a pair of tape rolls and connecting guide means disposed adjacent the base of the cassette which direct a substantially straight run of tape from one of the rolls to the other adjacent the base, comprising track means within the head compartment disposed substantially parallel to the base and spaced therefrom between the largest diameter of the rolls and the base, a substantially rigid one-piece bow-shaped member having a substantially straight midportion and a pair of arcuate ends, the curvature of the arcuate ends being large enough to receive the largest diameter of the rolls within them, the tip section of the arcuate ends engaging and guiding the tape to and from the rolls, movable connecting means coupling the substantially straight midportion of the bow member to the track means whereby the bow member may be caused to longitudinally slide back and forth along the track means, and the distance between the arcuate ends of the bow member being equal to at least the sum of the axial interval between the two winding rolls and twice the average radius of the rolls of tape whereby the bow member is caused to shift longitudinally parallel relative to a line through the axis of the rolls of tape for moving the tip sections of the bow member adjacent the periphery of the rolls to smoothly guide the tape on and off the rolls as their diameters vary.

2. A tape-winding control as set forth in claim 1 wherein the track means comprises a guide groove, and the movable connecting means comprises projections on the substantially straight midportion of the bow member which engage the guide groove.

3. A tape-winding control as claimed in claim 1, wherein the straight part of the bow is in the form of a U-cross-section rail.

4. A tape-winding control as claimed in claim 1, wherein the ends of the bow have two lateral flanges.

5. A tape-winding control as claimed in claim 1, wherein holding means for accommodating a leaf spring resting on the roll of tape on the winding side are arranged in the middle of the bow.

6. A tape-winding control as claimed in claim 5, wherein the leaf spring is mounted for rotation on a pin.

7. A tape-winding control as claimed in claim 6, wherein the leaf spring has the shape of a T, the cross-piece of the T being guided in an arcuate cut-out in the cassette.

8. A tape-winding control as set forth in claim 1 wherein the arcuate ends of the bow member are substantially quarter circular.

* * * * *

UNITED STATES PATENT OFFICE

CERTIFICATE OF CORRECTION

PATENT NO. : 3,923,271

DATED : December 2, 1975

INVENTOR(S) : Albert Pertzsch, et al

It is certified that error appears in the above–identified patent and that said Letters Patent are hereby corrected as shown below:

Change "[76] Albert Pertzsch; Jose Toral; Gottfried Lutz; Werner Wilke; Anton Riedel, all of AGFA-Gevaert Aktiengesellschaft, Munich, German" to -- [75] Inventors: Albert Pertzsch; Jose Toral; Gottfried Lutz; Werner Wilke; Anton Riedel; all of Munich Germany --

And add the following

-- [73] Assignee AGFA-Gevaert Aktiengesellschaft, Leverkusen, Germany

Signed and Sealed this

*twenty-second* Day of *June 1976*

[SEAL]

*Attest:*

RUTH C. MASON
*Attesting Officer*

C. MARSHALL DANN
*Commissioner of Patents and Trademarks*